US010891659B2

(12) United States Patent
Schneider

(10) Patent No.: US 10,891,659 B2
(45) Date of Patent: Jan. 12, 2021

(54) PLACING RESOURCES IN DISPLAYED WEB PAGES VIA CONTEXT MODELING

(75) Inventor: James Paul Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1263 days.

(21) Appl. No.: 12/475,413

(22) Filed: May 29, 2009

(65) Prior Publication Data
US 2010/0306026 A1   Dec. 2, 2010

(51) Int. Cl.
*G06Q 30/02*   (2012.01)

(52) U.S. Cl.
CPC ......... *G06Q 30/0273* (2013.01); *G06Q 30/02* (2013.01); *G06Q 30/0275* (2013.01)

(58) Field of Classification Search
USPC ........ 706/12; 1/1; 707/5; 705/14, 69, 26, 10
See application file for complete search history.

(56) References Cited

U.S. PATENT DOCUMENTS

| | | | |
|---|---|---|---|
| 5,550,741 A | 8/1996 | Nakajima | |
| 5,796,356 A | 8/1998 | Okada et al. | |
| 5,801,648 A | 9/1998 | Satoh et al. | |
| 5,844,508 A | 12/1998 | Murashita et al. | |
| 5,848,198 A | 12/1998 | Penn | |
| 5,907,637 A | 5/1999 | Murashita et al. | |
| 6,026,198 A | 2/2000 | Okada | |
| 6,061,398 A | 5/2000 | Satoh et al. | |
| 6,567,797 B1 * | 5/2003 | Schuetze et al. | |
| 6,738,759 B1 | 5/2004 | Wheeler et al. | |
| 7,124,149 B2 | 10/2006 | Smith et al. | |
| 7,593,932 B2 | 9/2009 | Lindh et al. | |
| 7,831,559 B1 | 11/2010 | Mohan et al. | |
| 8,386,511 B2 | 2/2013 | Schneider | |
| 8,396,850 B2 | 3/2013 | Schneider | |
| 8,527,500 B2 | 9/2013 | Schneider | |
| 9,251,520 B2 * | 2/2016 | Shen | G06Q 30/02 |
| 2002/0065857 A1 | 5/2002 | Michalewicz et al. | |
| 2002/0094080 A1 | 7/2002 | Duan et al. | |
| 2003/0012400 A1 | 1/2003 | McAuliffe et al. | |
| 2003/0033288 A1 | 2/2003 | Shanahan et al. | |
| 2003/0061200 A1 | 3/2003 | Hubert et al. | |

(Continued)

OTHER PUBLICATIONS

Hua-Jun Zeng, Qi-Cai He, Zheng Chen, Wei-Ying Ma, Jinwen Ma, "Learning to Cluster Web Search Results", ACM, Jul. 25-29, 2004, 8 pgs.

(Continued)

*Primary Examiner* — Saba Dagnew
(74) *Attorney, Agent, or Firm* — Lowenstein Sandler LLP

(57) ABSTRACT

An advertisement platform system makes advertisement placement decision via context modeling. The advertisement platform system receives advertisements and a plurality of advertisement target pages, wherein each of the advertisements is associated with one of the advertisement target pages. Furthermore, the advertisement platform system computes a similarity metric between one of the advertisement target and a displayed page. The advertisement platform system selects one of the advertisements for display in the display page based on the computed similarity metric between one of the plurality of advertisement target that corresponds to the selected one of the advertisement and the display page.

8 Claims, 8 Drawing Sheets

(56) References Cited

U.S. PATENT DOCUMENTS

| | | |
|---|---|---|
| 2003/0065503 A1 | 4/2003 | Agnihotri et al. |
| 2003/0101164 A1 | 5/2003 | Pic et al. |
| 2003/0154071 A1 | 8/2003 | Shreve |
| 2003/0200505 A1 | 9/2003 | Evans |
| 2004/0064438 A1 | 4/2004 | Kostoff |
| 2004/0217944 A1 | 11/2004 | Kong |
| 2005/0086224 A1 | 4/2005 | Franciosa et al. |
| 2005/0102614 A1 | 5/2005 | Brockett et al. |
| 2005/0108001 A1 | 5/2005 | Aarskog |
| 2006/0015486 A1 | 1/2006 | Nomiyama et al. |
| 2006/0089924 A1 | 4/2006 | Raskutti et al. |
| 2006/0235687 A1 | 9/2006 | Carus et al. |
| 2006/0242017 A1* | 10/2006 | Libes ............... G06F 17/30864 705/14.54 |
| 2007/0061320 A1 | 3/2007 | Surendran |
| 2007/0061348 A1 | 3/2007 | Holland et al. |
| 2007/0206884 A1 | 9/2007 | Kato |
| 2007/0233477 A1 | 10/2007 | Halowani et al. |
| 2008/0005651 A1 | 1/2008 | Grefenstette et al. |
| 2008/0052273 A1 | 2/2008 | Pickens |
| 2008/0082531 A1 | 4/2008 | Suarez |
| 2008/0114750 A1 | 5/2008 | Saxena et al. |
| 2008/0162455 A1 | 7/2008 | Daga et al. |
| 2008/0162456 A1 | 7/2008 | Daga et al. |
| 2008/0243797 A1* | 10/2008 | Song ............... G06F 17/3089 |
| 2008/0270119 A1 | 10/2008 | Suzuki |
| 2009/0030671 A1 | 1/2009 | Kwon et al. |
| 2009/0055380 A1 | 2/2009 | Peng et al. |
| 2009/0112840 A1* | 4/2009 | Murdock et al. ............... 707/5 |
| 2009/0125805 A1 | 5/2009 | Ananthanarayanan et al. |
| 2009/0265290 A1* | 10/2009 | Ciaramita et al. ............... 706/12 |
| 2009/0282027 A1* | 11/2009 | Subotin et al. ............... 707/5 |
| 2010/0005087 A1 | 1/2010 | Basco et al. |
| 2010/0027051 A1 | 2/2010 | Hamilton et al. |
| 2010/0131569 A1 | 5/2010 | Jamison et al. |
| 2011/0093346 A1* | 4/2011 | Lunt ............... G06F 17/30864 705/14.71 |
| 2011/0320453 A1 | 12/2011 | Gallivan et al. |

OTHER PUBLICATIONS

Asela Gunawardana and Christopher Meek, "Aggregators and Contextual Effects in Search Ad Markets", http://research.microsoft.com/apps/pubs/default.aspx?id=69503, WWW 2008, Apr. 21-25, 2008, Beijing China, 5 pgs.

Asela Gunawardana, Christopher Meek and Jody Biggs, "A Quality-Based for Search Ad Markets with Aggregators", http://research.microsoft.com/apps/pubs/default.aspx?id=69510, Jun. 1, 2008, 10 pgs.

Red Hat Office Action for U.S. Appl. No. 12/395,341 dated Jul. 6, 2011.

Red Hat Final Office Action for U.S. Appl. No. 12/395,319 dated Aug. 15, 2011.

Red Hat Office Action for U.S. Appl. No. 12/395,319 dated Mar. 24, 2011.

Red Hat Office Action for U.S. Appl. No. 12/395,507 dated Jul. 15, 2011.

* cited by examiner

PLACING RESOURCES IN DISPLAYED WEB PAGES VIA CONTEXT MODELING

RELATED APPLICATIONS

This application is related to co-pending U.S. patent application Ser. No. 12/395,319, filed Feb. 27, 2009, entitled "PREPROCESSING TEXT TO ENHANCE STATISTICAL FEATURES," co-pending U.S. patent application Ser. No. 12/395,341, filed Feb. 27, 2009, entitled "MEASURING CONTEXT SIMILARITY," and co-pending U.S. patent application Ser. No. 12/395,507, filed Feb. 27, 2009, entitled "DISCRIMINATING SEARCH RESULTS BY PHRASE ANALYSIS", which are assigned to a common assignee of the present application.

TECHNICAL FIELD

Embodiments of the present invention relate to a method and system for online based advertisements. Specifically, embodiments of the invention relate to placing pay-per-click advertisements based on contextual modeling.

BACKGROUND

In online advertising, advertisers bid to have online advertisements displayed in online information and pay for these advertisements based on the number of times each advertisement is accessed. For example, an advertiser bids to have a web-based advertisement for a good or service displayed in a web page. Using a pay-per-click model, advertisers pay an advertising platform service when the online advertisement is accessed.

However, a problem is that limited context is used by the advertising platform for placement of these advertisements. Typically, advertisements are placed directly in search engine rankings based on an auction for placement using on keywords. In addition, advertisements that appears in third-party websites are also placed based on keyword matching of page content to a related auction. Unfortunately, keyword-based placement is limited, because keywords can have different meanings. For example, political discussion web sites that mention the former president Clinton and the state of North Carolina can place advertisements for services available in the town of Clinton, N.C.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

An advertisement platform places advertisements in displayed web pages based on similarity metrics between a displayed web page and target pages linked to the advertisements. In particular, in one embodiment, the advertisement platform computes similarity metrics between the content of the displayed web page and the content of target pages linked to the advertisements. The advertisement platform further selects a set of advertisements based on the computed similarity metrics and ranks these advertisements based on bids associated with each of the advertisements. The advertisement platform makes advertisement placement decisions based using the ranked list.

In another embodiment, the advertisement platform receives a list of search results, where each of the search results is linked to target search page. The advertisement platform computes a similarity metric between content in each of the target search pages and content in each of target pages linked to the advertisements. The advertisement platform further selects a set of advertisements based on the computed similarity metrics and ranks these advertisements based on bids associated with each of the advertisements. The advertisement platform makes advertisement placement decisions based using the ranked list.

Figure 1:
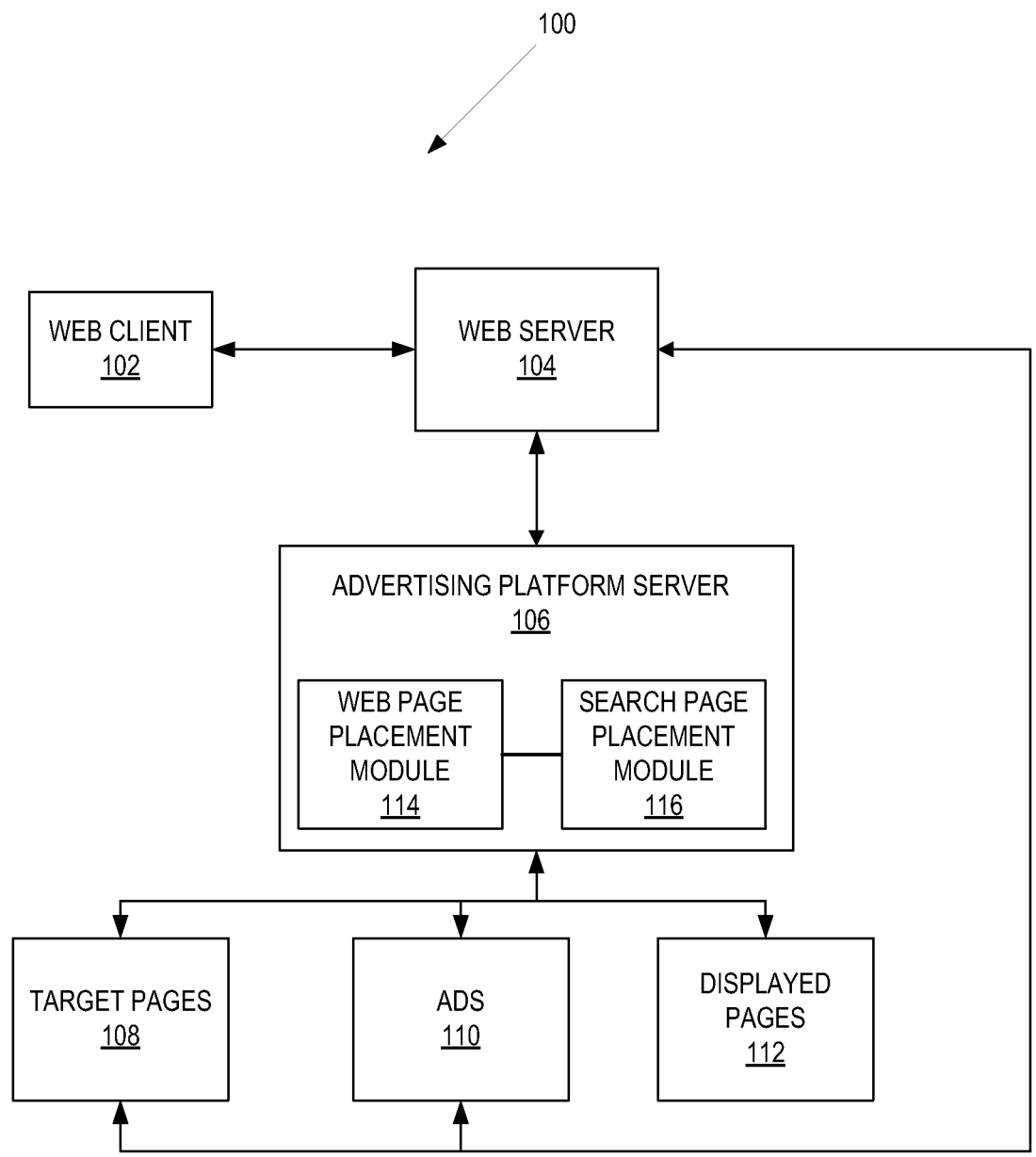
FIG. 1 is a block diagram of one embodiment of an advertisement platform system.

FIG. 1 is a block diagram of one embodiment of an advertisement platform system 100. Advertisement platform system 100 is a system that delivers online advertisements to one or more clients. In one embodiment, advertisement platform system 100 is a web based advertisement system that delivers web based advertisements that are inserted in web pages to different web clients. Advertisement platform system 100 is composed of client 102, web server 104, advertising platform server 106, target pages 108, advertisements 110, and displayed pages 112. In one embodiment, client 102 is a standard web client as is known in the art and requests web pages include a web advertisement or other type of online advertisement. Client 102 accesses an online advertisements by making a request for that online advertisement through server 104.

Advertisement 110 can be a web advertisement or other type of advertisement accessible online as known in the art. In one embodiment, one or more advertisements 110 is inserted into one of displayed pages 112. In one embodiment, advertisement 110 is a pay-per-click advertisement page. Displayed pages 112 is a web page that requests to have an advertisement inserted into that displayed page. Target pages 108 are the pages that are linked to by advertisements 110.

Advertising platform server 106 couples to server 104, target pages 108, advertisements 110, and displayed pages 112. In one embodiment, server 104 receives online information requests from client 102 and transmits online information (e.g., web pages, etc.) to client 102. In addition, server 104 retrieves advertisements 110 for placement from advertising platform server 106.

Advertisement platform server 106 is a platform that places advertisements 110 into displayed pages 112. In one embodiment, advertisement platform server 106 makes advertisement placement decision based on the contextual similarity between the content of target pages 108 and displayed pages 112. In this embodiment, advertisements are also placed based on an auction—advertisers bid the amount which they are willing to spend per user click—and the advertising platform places advertisements based on the auction results. However, the context of the displaying page is compared to the context of the advertisement target page, and similarity, rather than keyword matching, is used to select the set of advertisements eligible for placement.

Calculating the similarity metric between a target page and a displayed page could be performed using semantic or contextual analysis of the pages. In one embodiment, a multi-dimensional context metric could be calculated for the pages of interest, and this metric matched between targets and displayed pages as described in FIG. 3 below.

In this model, the advertiser submits their advertisements, the targets of those advertisements, and the bids they are willing to make on those advertisements. The advertiser does not select keywords for the advertisements or targets, which makes it simpler for the advertiser. The advertiser can determine how competitive their placement will be by information provided by the advertising platform by displaying either ranking or absolute amounts for advertisement targets contextually similar to the advertiser's page(s).

For example, and in one embodiment, an online merchant selling upscale handbags wants to advertise three new bags. In the traditional keyword-driven model, in addition to the advertisements, the merchant would generate a list of keywords related to the bags ("Versace", "Gucci", "Gucci handbag", "Marc Jacobs purse", etc.). The advertising platform provides an indication of how competitive the merchant's bids are, relative to others bidding on those specific keywords: "The number one bid for 'Prada handbag' is $0.18", or "Your bid of $0.14 for 'designer handbag' is fourth place."

In contrast, advertising platform server 106 using the method described below calculates the similarity metrics for the pages, and responds to the merchant with statistics on where the advertisement ranks. For example, and in one embodiment, ranking information can be "The number one bid for pages similar to your page named '2009 Spring Prada Bags' is $0.17", or "Your bid of $0.12 for your page named '2009 Spring Fendi Bags' would rank #2 against similar pages".

Figure 2:
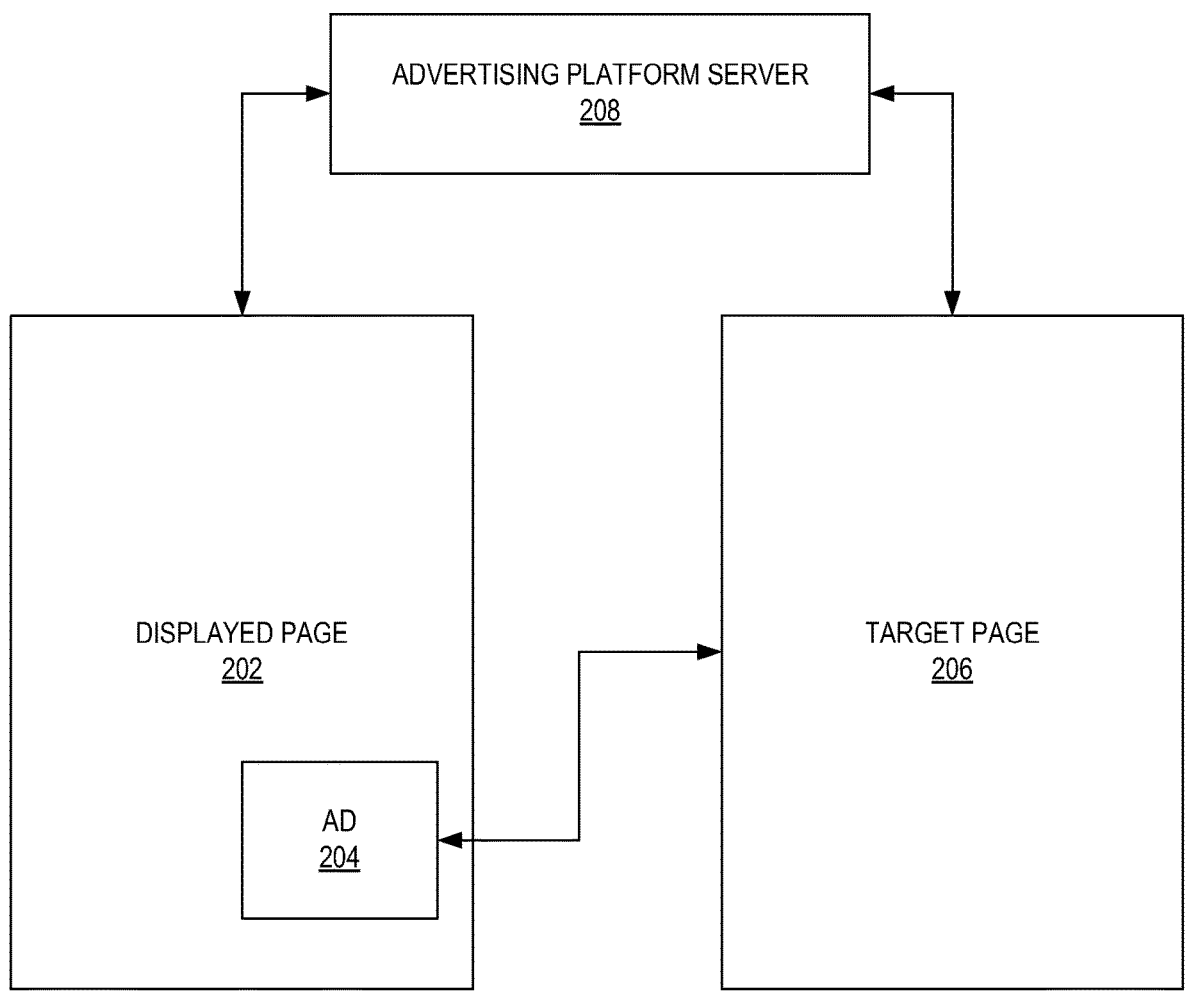
FIG. 2 is a block diagram of an advertisement platform server that makes placement decisions for an advertisement in a displayed web page.

FIG. 2 is a block diagram of an advertisement platform server 208 that makes placement decisions of an advertisement in a displayed web page. In FIG. 2, advertisement platform server 208 makes placement decisions of whether to place an advertisement 204 in the displayed page 202 based on the similarity metric of the content in target page 206 and content in displayed page 202. Target page 206 is the web page linked to by advertisement 204. Computing the similarity measure is described further in FIG. 3 below.

Figure 3:
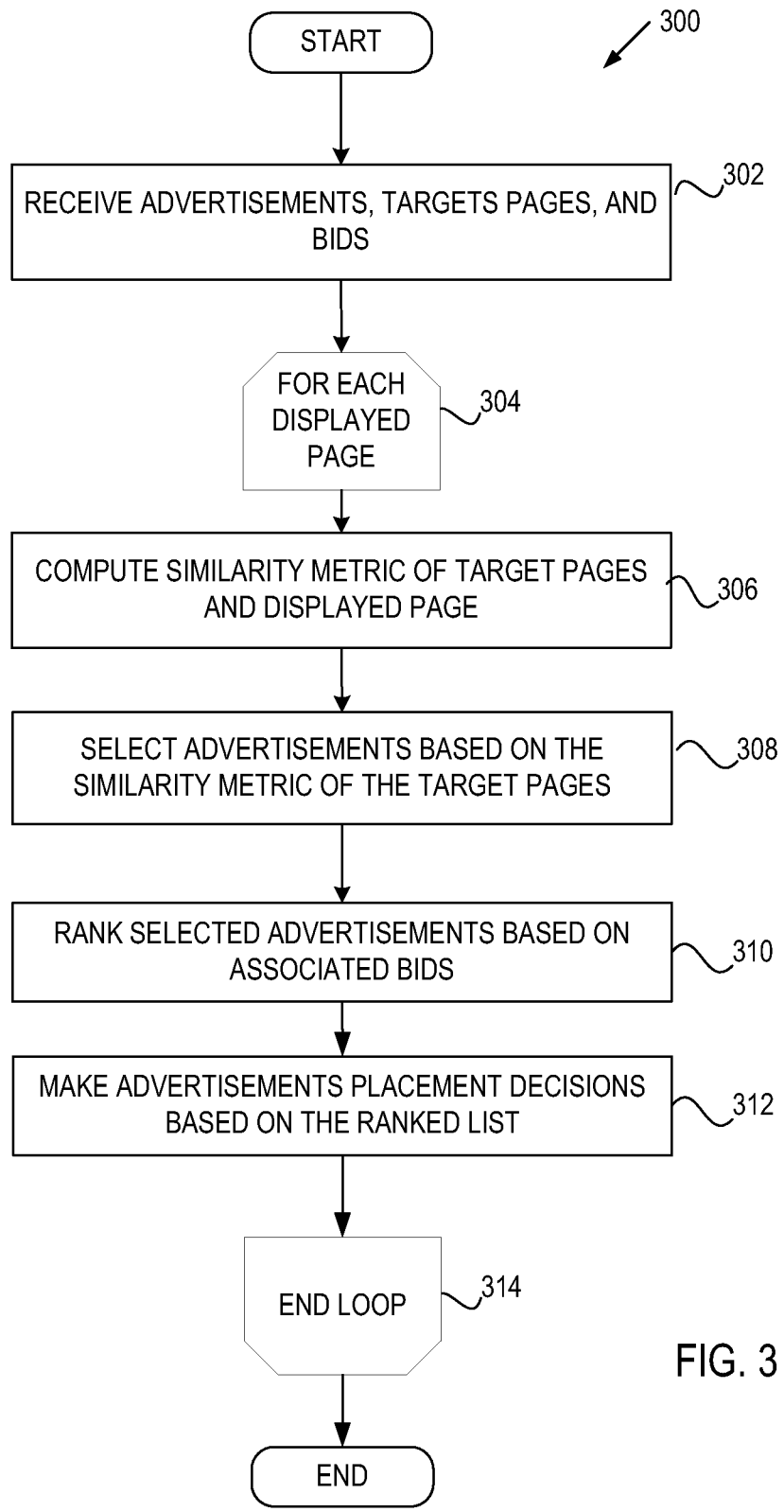
FIG. 3 is a flowchart of one embodiment of a process for placing pay-per-click advertisements in a web page via context modeling.

FIG. 3 is a flowchart of one embodiment of a process 300 for placing pay-per-click advertisements in a web page via context modeling. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by web page placement module in an advertisement platform server, such as web page placement module 114 of FIG. 1.

Referring to FIG. 3, process 300 begins by receiving advertisements, advertisement target pages, and bids. In one embodiment, advertisements contain links to a corresponding target page. In another embodiment, an advertisement is a pay-per-click advertisement. In a further embodiment, each advertisement has an associated bid, which represents the maximum amount an advertiser will pay to have their advertisement accessed.

Process 300 further executes a processing loop (blocks 304-314) to make advertisement placement decisions based on similarity metrics. At block 306, process 300 computes the similarity of the targets pages and the displayed pages. Process 300 can use a contextual similarity metric, semantic similarity metric, etc. to compute similarities. In one embodiment, process 300 computes a similarity metric between one of the target pages and the displayed pages by discriminating search results with phrase analysis as described in co-pending U.S. patent application Ser. No. 12/395,507, filed Feb. 27, 2009, entitled "DISCRIMINATING SEARCH RESULTS BY PHRASE ANALYSIS," Alternatively, process 300 can compute the similarity metric by computing a similarity model for the displayed page and using this model to compute a contextual similarity metric between the displayed page and the target pages. This embodiment is further described in co-pending U.S. patent application Ser. No. 12/395,341, filed Feb. 27, 2009, entitled "measuring context similarity." In a further embodiment, process 300 may also preprocess the displayed and target pages to increase contextual similarity matching as described in co-pending U.S. patent application Ser. No. 12/395,319, filed Feb. 27, 2009, entitled "PREPROCESSING TEXT TO ENHANCE STATISTICAL FEATURES."

Based on the computed similarity metrics, process 300 selects one or more advertisements that are associated with target pages that are similar to the displayed page at block 308. In one embodiment, process 300 selects a subset of the target pages have a minimum similarity metric with the displayed page. Process 300 further selects the advertisements that are associated with one or more of the target pages in the subset. For example, and in one embodiment, if process 300 selects four target pages about high-end handbags that have the required similarity to the displayed page, process 300 selects the advertisements that are linked to these four target pages. In this embodiment, the number of selected advertisements can be the same, greater or less than the number of selected target pages. This is because an advertisement can link to more than one target page and/or more than one advertisement can link to the same target page.

At block 310, process 300 ranks the selected advertisements based on the associated bids with the advertisements. For example and in one embodiment, an advertisement with a bid of $0.18 is ranked higher than an advertisement with a $0.12 bid.

Process 300 makes advertisement placement decisions at block 312. For example and in one embodiment, the highest ranked advertisement is placed in the displayed page. Alternatively, an advertisement is placed in proportion to the total bids. In this embodiment, if a bid for an advertisement represents 40% of the total bids, this advertisement is placed 40% of the time. The processing loop ends at block 314.

Figure 4:
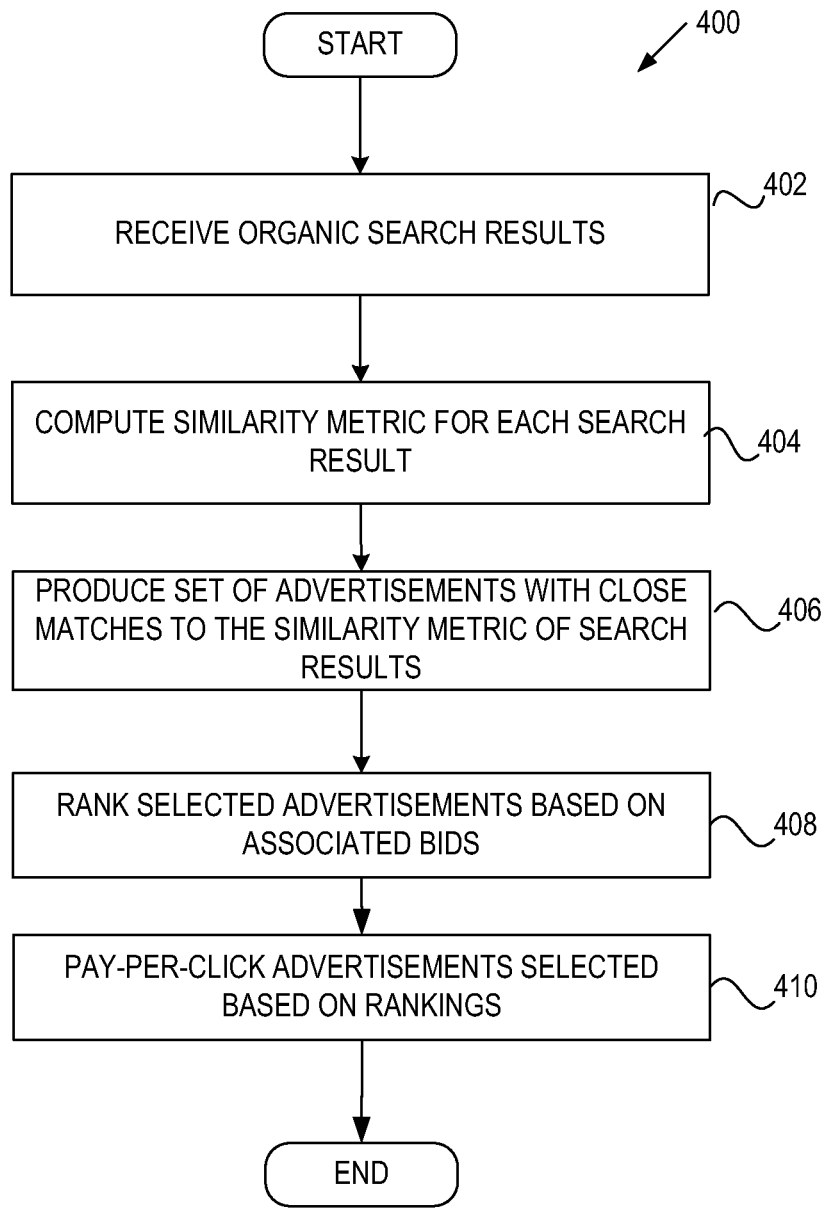
FIG. 4 is a flowchart of one embodiment of a process for placing pay-per-click advertisements in a search results page via context modeling.

FIG. 4 is a flowchart of one embodiment of a process 400 for placing pay-per-click advertisements in a search results page via context modeling. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by search page placement module in an advertisement platform server, such as search page placement module 116 of FIG. 1.

Referring to FIG. 4, process 400 begins by receiving the organic search results at block 402 as is known in the art. For example and in one embodiment, a search engine sends search results to advertising platform server. In one embodiment, this organic search result is composed of a list of results that are each linked to target result page.

At block 404, process 400 computes a similarity metric for each search result with each potential advertisement. In one embodiment, process 400 computes a similarity metric between the target pages associated with the advertisement and the target result page. Process 400 can compute a contextual similarity metric, semantic similarity metric. etc. as described above in FIG. 3, block 306. The relationship between the target results page and advertisement target page is further described in FIG. 5 below.

At block 406, process 400 produces a set of advertisements with close matches to the contextual metric of the search results. In one embodiment, process 400 selects a set of advertisements that meet a minimum similarity criteria requirement.

Process 400 ranks the selected advertisements based on bids associated with each advertisement at block 408. In one embodiment, process 400 ranks the bids as described in FIG. 3, block 310 above. At block 410, process 400 selects pay-per-click advertisements to be placed in the search results page based on the computed ranking. In one embodiment, process 400 selects the number of advertisements that is equal to the number of advertisement slots that are available in the search page. In another embodiment, if there are five slots available in the search results page for advertisements, process 400 selects the top five. Alternatively, process 400 proportionally selects advertisements for the available slots. In a further embodiment, process 400 tracks which advertisements have been placed for a particular user to avoid displaying the same advertisement to the same user multiple times in succession.

Figure 5:
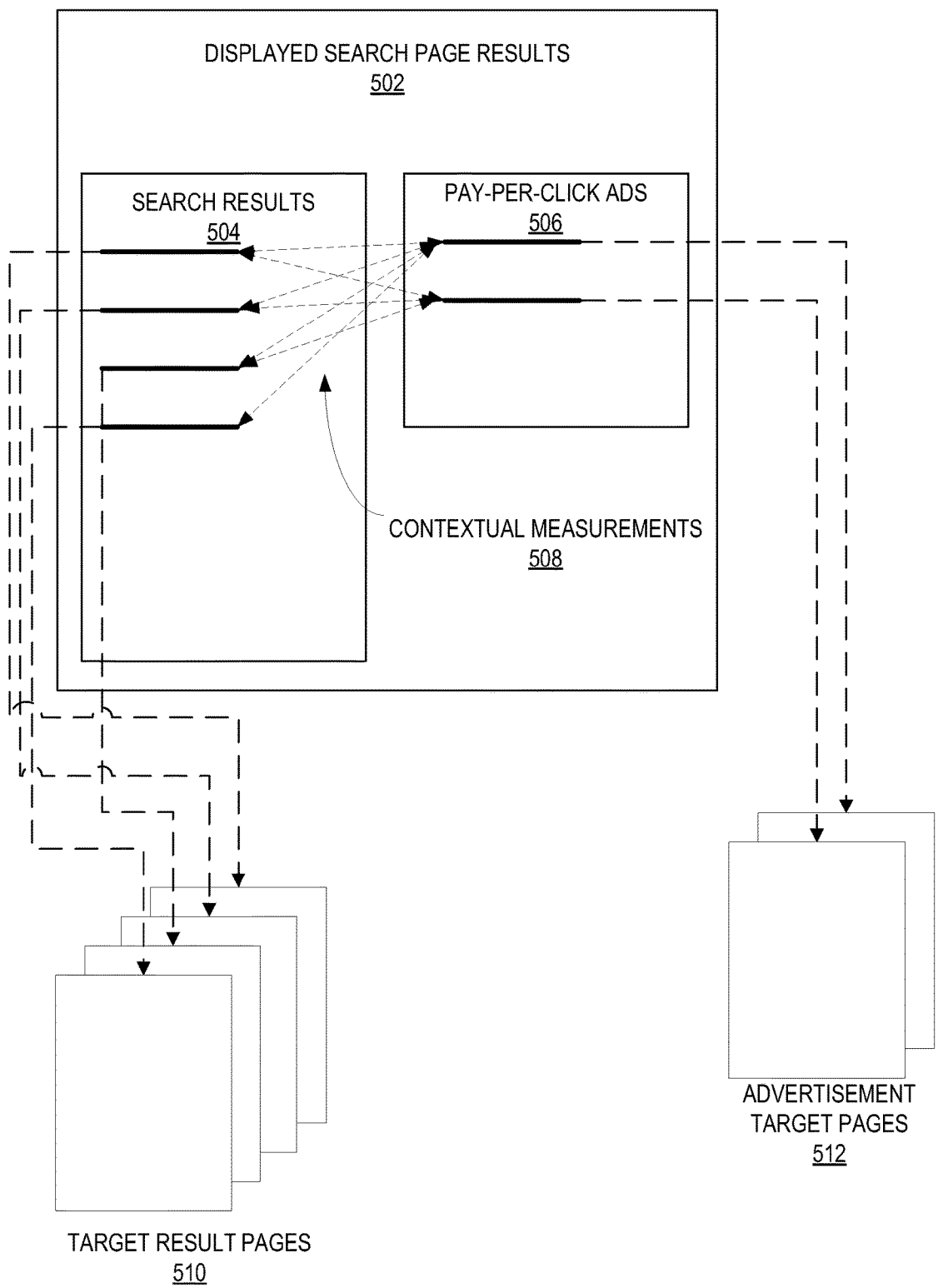
FIG. 5 is a block diagram of a displayed search page result.

FIG. 5 is a block diagram of a displayed search page result 502. In FIG. 5, displayed search page result 502 is composed of four search results 504 on the left side of page 502 and two pay-per-click advertisements 506 on the right side of page 502. Each of the search results 504 is linked to the target result page 510. Furthermore, each of pay-per-click advertisements 506 is linked to advertisement targets pages 512. The similarity metric computed in FIG. 4, block 404 is between the content in one of the target result pages 510 and the content of one of the advertisement target pages 512. Based on the computed similarity metrics, placement decisions for pay-per-click advertisements is made.

Figure 6:
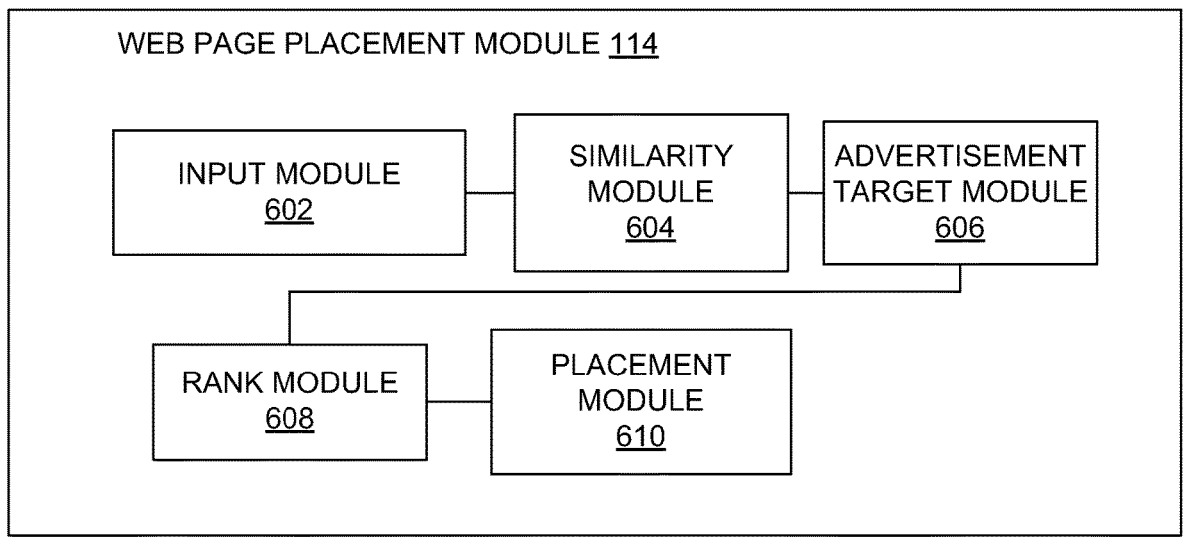
FIG. 6 is a block diagram of a web page placement module that makes placement decisions of an advertisement in a displayed web page.

FIG. 6 is a block diagram of a web page placement module 114 that makes placement decisions of an advertisement in a displayed web page. Web page placement module 114 is composed of input module 602, similarity module 604, advertisement target module 606, rank module 608, and placement module 610. Input module 602 receives the input advertisements, advertisement target pages, and bids as described in FIG. 3, block 302. Similarity module 604 computes the similarity of the target pages and the displayed page as described in FIG. 3, block 306, advertisement target module 606 selects the advertisements based on the contextual similarity of the target pages as described in FIG. 3, block 308. Rank module 608 ranks selected advertisements based on associated bids as described in FIG. 3, block 310. Placement module 610 makes advertisement placement decisions based on the ranked list as described in FIG. 3, block 312.

Figure 7:
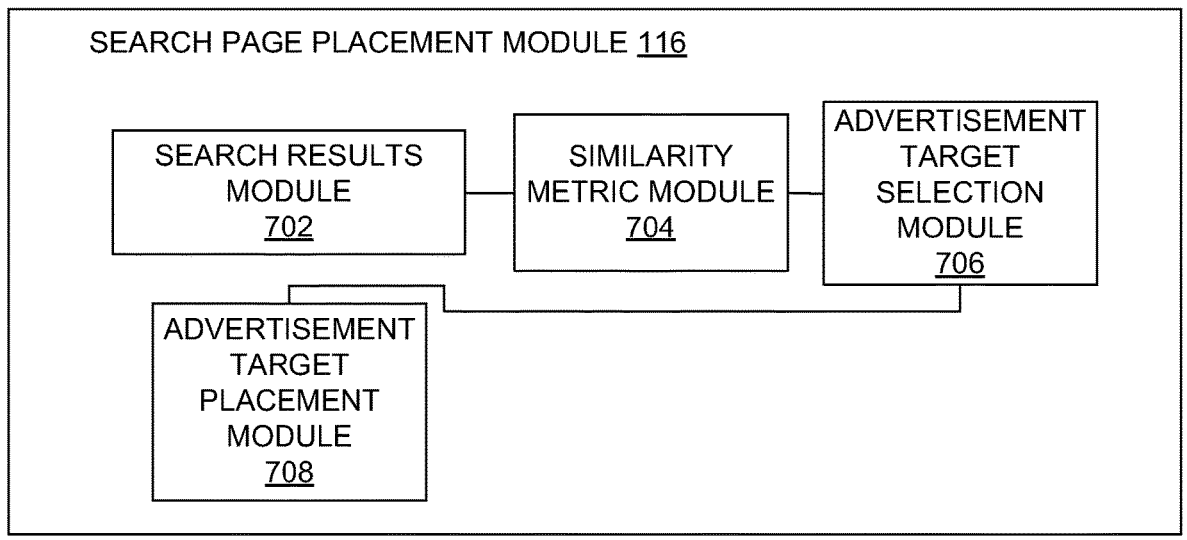
FIG. 7 is a block diagram of a search page placement module that makes placement decisions of an advertisement in a displayed search results page.

FIG. 7 is a block diagram of a search page placement module 116 that makes placement decisions of an advertisement in a displayed search results page. Search page placement module 116 is composed of search results module 702, contextual metric module 704, advertisement target selection module 706, and advertisement target placement module 708. Search results module 702 produces the organic search results as described in FIG. 4, block 402. Contextual metric module 704 produces the set of advertisements with close matches to the contextual metric of search results as described in FIG. 4, block 404, advertisement target selection module 706 ranks selected advertisements based on associated bids as described in FIG. 4, block 406, advertisement target placement module 708 selects advertisements based on advertisement rankings as described in FIG. 4, block 408.

Figure 8:
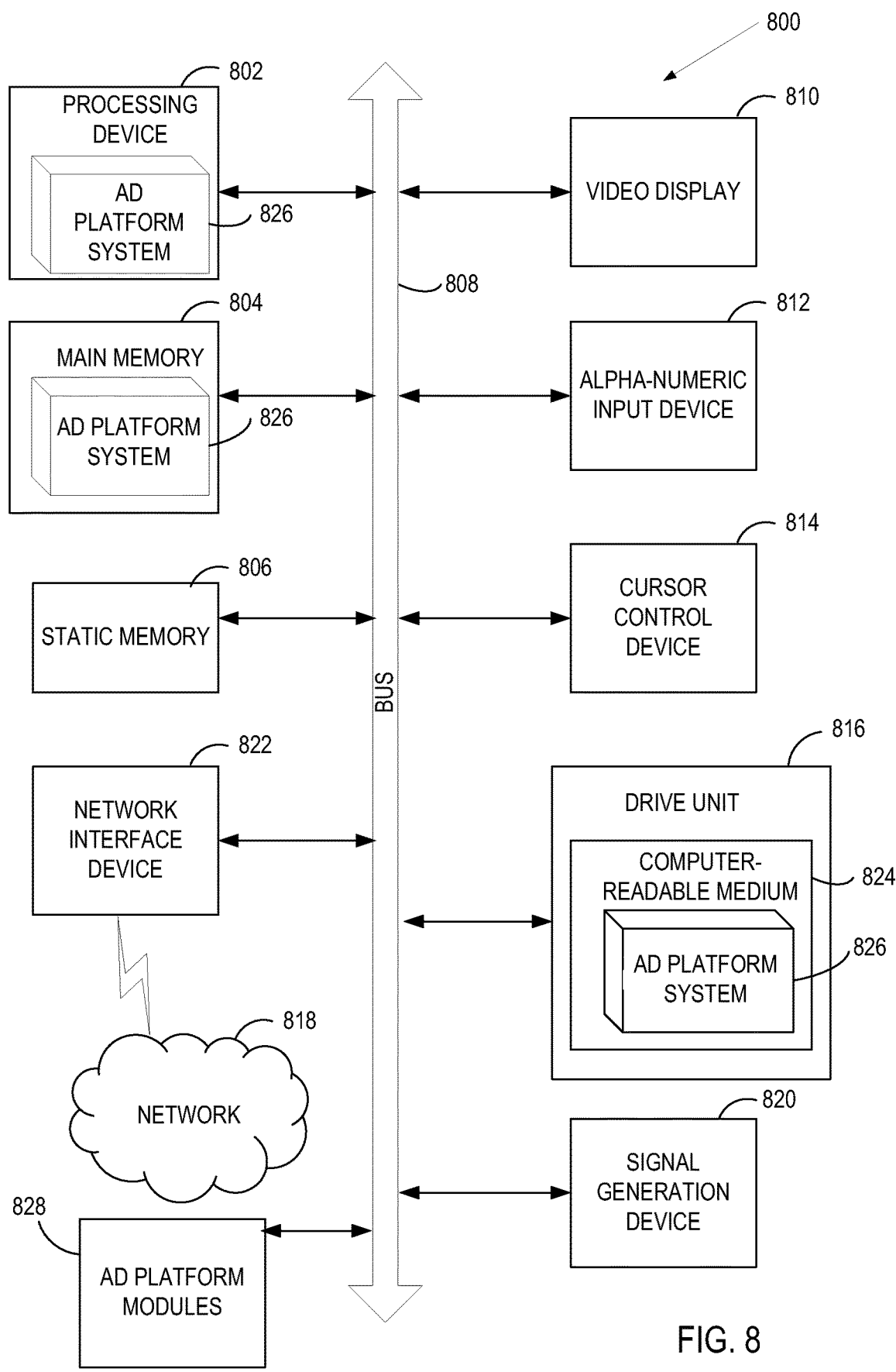
FIG. 8 is a diagram of one embodiment of a computer system for making advertisement placement decisions via context modeling.

FIG. 8 is a diagram of one embodiment of a computer system 800 for placing advertisements via context modeling. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer accessing online information and the server computer placing advertisements via context modeling) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the advertisement platform system 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the advertisement platform system 826) embodying any one or more of the methodologies or functions described herein. The advertisement platform system 826 may also reside, completely or at least partially, within the main memory 804 and/or within the processing device 802 during execution thereof by the computer system 800, the main memory 804 and the processing device 802 also constituting machine-readable storage media. The advertisement platform system 826 may further be transmitted or received over a network 818 via the network interface device 822.

The computer-readable storage medium 824 may also be used to store the advertisement platform system 826 persistently. While the computer-readable storage medium 826 is shown in an exemplary embodiment to be a single medium the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein (for example in relation to FIG. 1) can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "computing," "determining," "selecting," "receiving," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for placing advertisements via context modeling been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   receiving, by a processing device, a plurality of resources to be inserted in a plurality of displayed web pages and receiving an indication of a plurality of target web pages and a plurality of bids associated the plurality of resources, wherein each of the plurality of resources is linked to one of the plurality of target web pages, without receiving keywords corresponding to the plurality of resources or target web pages; and for a first displayed web page of the plurality of displayed web pages:

computing, by the processing device, a multi-dimensional context similarity metric between each of the plurality of target web pages and the first displayed web page, wherein an advertising platform server coupled to one or more client devices via a network computes the multi-dimensional context similarity metric using at least one of semantic or contextual analysis of the plurality of target web pages and the first displayed web page, wherein the multi-dimensional context similarity metric is not based on keywords corresponding to the plurality of resources or target web pages, and wherein the computing comprises:

determining phrases that occur in the first displayed web page and in each of the plurality of target web pages; and identifying target web pages that comprise a same statistically improbable phrase as the first displayed web page, wherein the statistically improbable phrase is one of the determined phrases having both of:

a first probability of occurrence in the first displayed web page that is higher than a second probability of occurrence of other phrases in the first displayed web page; and a third probability of occurrence in the plurality of target web pages that is lower than a fourth probability of occurrence of other phrases in the plurality of target web pages;

selecting, by the processing device, a set of target web pages from the plurality of target web pages in view of the computed multi-dimensional context similarity metric between each of the plurality of target web pages and the first displayed web page, wherein the computed multi-dimensional context similarity metric for each of the set of target web pages is greater than a minimum value;

selecting, by the processing device, a set of resources from the plurality of resources, wherein each resource in the set of resources is associated with a target web page in the set of target web pages;

ranking the resources in the set of resources based on a first criteria, wherein the first criteria is associated with a subset of the plurality of bids corresponding to the resources in the set of resources;

causing display of information associated with the set of resources, the information comprising an indication of the ranking of the resources in the set of resources based on the subset of the plurality of bids, wherein the information associated with the set of resources to indicate a relative competitiveness of the subset of the plurality of bids without relying on keywords corresponding to the resources in the set of resources or the set of target web pages;

selecting a highest ranked resource for placement; and placing, by the processing device, the selected highest ranked resource from the selected set of resources for display in the first displayed web page on at least one of the one or more client devices coupled to the advertising platform server via the network.

2. The method of claim 1, wherein the highest ranked resource from the selected set of resources is displayed in one of the first displayed web page or a search results page.

3. The method of claim 1, wherein computing the multi-dimensional context similarity metric comprises:

receiving a plurality of search results, wherein each of the plurality of search results comprises a link to a target search page; and computing the multi-dimensional context similarity metric between each of the plurality of the target web pages and the target search page.

4. A non-transitory computer accessible storage medium having instructions stored thereon that, when accessed by a processing device, cause the processing device to:

receive a plurality of resources to be inserted in a plurality of displayed web pages and receive an indication of a plurality of target web pages and a plurality of bids associated the plurality of resources, wherein each of the plurality of resources is linked to one of the plurality of target web pages, without receiving keywords corresponding to the plurality of resources or target web pages; and for a first displayed web page of the plurality of displayed web pages:

compute a multi-dimensional context similarity metric between each of the plurality of target web pages and the first displayed web page, wherein an advertising platform server coupled to one or more client devices via a network computes the multi-dimensional context similarity metric using at least one of semantic or contextual analysis of the plurality of target web pages and the first displayed web page, wherein the multi-dimensional context similarity metric is not based on keywords corresponding to the plurality of resources or target web pages, and wherein to compute the multi-dimensional context similarity metric the processing device is to:

determine phrases that occur in the first displayed web page and in each of the plurality of target web pages; and identify target web pages that comprise a same statistically improbable phrase as the first displayed web page, wherein the statistically improbable phrase is one of the determined phrases having both of:

a first probability of occurrence in the first displayed web page that is higher than a second probability of occurrence of other phrases in the first displayed web page; and a third probability of occurrence in the plurality of target web pages that is lower than a fourth probability of occurrence of other phrases in the plurality of target web pages;

select a set of target web pages from the plurality of target web pages in view of the computed multi-dimensional context similarity metric between each of the plurality of target web pages and the first displayed web page, wherein the computed multi-dimensional context similarity metric for each of the set of target web pages is greater than a minimum value;

select a set of resources from the plurality of resources, wherein each resource in the set of resources is associated with a target web page in the set of target web pages for which the multi-dimensional context similarity metric between each resource in the set of resources and the first displayed web page in which one of the set of resources is inserted is greater than the minimum value;

rank the resources in the set of resources based on a first criteria, wherein the first criteria is associated with a subset of the plurality of bids corresponding to the resources in the set of resources;

cause display of information associated with the set of resources, the information comprising an indication of the ranking of the resources in the set of resources based on the subset of the plurality of bids, wherein the information associated with the set of resources to indicate a relative competitiveness of the subset of the plurality of bids without relying on keywords corresponding to the resources in the set of resources or the set of target web pages;

select a highest ranked resource for placement; and place the selected highest ranked resource from the selected set of resources for display in the first displayed web page on at least one of the one or more client devices coupled to the advertising platform server via the network.

5. The non-transitory computer accessible storage medium of claim 4, wherein the highest ranked resource from the selected set of resources is displayed in one of the first displayed web page or a search results page.

6. The non-transitory computer accessible storage medium of claim 4, wherein to compute the multi-dimensional context similarity metric, the processing device is further to:

receive a plurality of search results, wherein each of the plurality of search results comprises a link to a target search page; and compute the multi-dimensional context similarity metric between each of the plurality of the target web pages and the target search page.

7. A system comprising:

a memory;

a processing device, operatively coupled to the memory, to:

receive a plurality of resources to be inserted in a plurality of displayed web pages and receive an indication of a plurality of target web pages and a plurality of bids associated the plurality of resources, wherein each of the plurality of resources is linked to one of the plurality of target web pages; and for a first displayed web page of the plurality of displayed web pages:

compute a multi-dimensional context similarity metric between each of the plurality of target web pages and the first displayed web page, wherein an advertising platform server coupled to one or more client devices via a network computes the multi-dimensional context similarity metric using at least one of semantic or contextual analysis of the plurality of target web pages and the first displayed web page, wherein the multi-dimensional context similarity metric is not based on keywords corresponding to the plurality of resources or target web pages, and wherein to compute the multi-dimensional context similarity metric the processing device is to:

determine phrases that occur in the first displayed web page and in each of the plurality of target web pages; and identify target web pages that comprise a same statistically improbable phrase as the first displayed web page, wherein the statistically improbable phrase is one of the determined phrases having both of:

a first probability of occurrence in the first displayed web page that is higher than a second probability of occurrence of other phrases in the first displayed web page; and a third probability of occurrence in the plurality of target web pages that is lower than a fourth probability of occurrence of other phrases in the plurality of target web pages;

select a set of target web pages from the plurality of target web pages in view of the computed multi-dimensional context similarity metric between each of the plurality of target web pages and the first displayed web page, wherein the computed multi-dimensional context similarity metric for each of the set of target web pages is greater than a minimum value;

select a set of resources from the plurality of resources, wherein each resource in the set of resources is associated with a target web page in the set of target web pages for which the multi-dimensional context similarity metric between each resource in the set of resources and the first displayed web page in which one of the set of resources is inserted is greater than the minimum value;

rank the resources in the set of resources based on a first criteria, wherein the first criteria is associated with a subset of the plurality of bids corresponding to the resources in the set of resources;

cause display of information associated with the set of resources, the information comprising an indication of the ranking of the resources in the set of resources based on the subset of the plurality of bids, wherein the information associated with the set of resources to indicate a relative competitiveness of the subset of the plurality of bids without relying on keywords corresponding to the resources in the set of resources or the set of target web pages;

select a highest ranked resource for placement; and place the selected highest ranked resource from the selected set of resources for display in the first displayed web page on at least one of the one or more client devices coupled to the advertising platform server via the network.

8. The system of claim 7, wherein to compute the multi-dimensional context similarity metric, the processing device is further to:

receive a plurality of search results, wherein each of the plurality of search results comprises a link to a target search page; and compute the multi-dimensional context similarity metric between each of the plurality of the target web pages and the target search page.

* * * * *